(12) United States Patent
Siress et al.

(10) Patent No.: US 8,463,813 B2
(45) Date of Patent: *Jun. 11, 2013

(54) INDIVIDUALIZED DATA SHARING

(75) Inventors: Anthony Siress, Mountain View, CA (US); Mark Fitzpatrick, San Mateo, CA (US)

(73) Assignee: YOUnite, Inc., Mountain View, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 12/793,597

(22) Filed: Jun. 3, 2010

(65) Prior Publication Data

US 2011/0137946 A1    Jun. 9, 2011

Related U.S. Application Data

(63) Continuation-in-part of application No. 12/715,306, filed on Mar. 1, 2010, now Pat. No. 8,108,533, which is a continuation of application No. 11/734,664, filed on Apr. 12, 2007, now Pat. No. 7,698,445.

(60) Provisional application No. 61/183,942, filed on Jun. 3, 2009.

(51) Int. Cl.
*G06F 17/30* (2006.01)

(52) U.S. Cl.
USPC .......................................... 707/781; 709/229

(58) Field of Classification Search
USPC ................. 707/694, 702, 781, 782, 783, 784, 707/785, 787
See application file for complete search history.

(56) References Cited

U.S. PATENT DOCUMENTS

| | | | |
|---|---|---|---|
| 6,269,369 B1 | 7/2001 | Robertson | |
| 6,526,513 B1* | 2/2003 | Shrader et al. | 726/4 |
| 6,754,665 B1 | 6/2004 | Futagami et al. | |
| 6,990,482 B1 | 1/2006 | Piotrowski et al. | |
| 7,003,546 B1 | 2/2006 | Cheah | |
| 7,139,555 B2 | 11/2006 | Apfel | |
| 7,277,911 B2 | 10/2007 | Cheah | |
| 7,316,013 B2 | 1/2008 | Kawano et al. | |
| 7,461,071 B2 | 12/2008 | Fitzpatrick et al. | |
| 7,698,445 B2 | 4/2010 | Fitzpatrick et al. | |
| 7,743,019 B2 | 6/2010 | Shah et al. | |
| 7,743,100 B2 | 6/2010 | Cheah | |
| 8,151,342 B2* | 4/2012 | Choi et al. | 726/16 |
| 2002/0059236 A1* | 5/2002 | Satoh | 707/9 |
| 2002/0083327 A1* | 6/2002 | Rajasekaran et al. | 713/182 |
| 2002/0174363 A1 | 11/2002 | Chefalas et al. | |
| 2002/0194100 A1 | 12/2002 | Choban et al. | |
| 2003/0069874 A1 | 4/2003 | Hertzog et al. | |

(Continued)

OTHER PUBLICATIONS

Co-pending U.S. Appl. No. 11/397,817, filed Apr. 3, 2006.

(Continued)

*Primary Examiner* — Cam-Linh Nguyen
(74) *Attorney, Agent, or Firm* — Sheppard Mullin Richter & Hampton LLP

(57) ABSTRACT

Granting permissions for attributes in a distributed data store involves implementing a federated control system. The system can include dynamic permissions granted to content blobs. Acknowledgment of dynamic permissions facilitates identification of users that receive content to enable restoring data on a machine following data loss. Acceptance of dynamic permissions can further facilitate automatic updates to data, or providing content blobs in response to changes in user attributes.

20 Claims, 8 Drawing Sheets

U.S. PATENT DOCUMENTS

| | | | |
|---|---|---|---|
| 2004/0215734 A1* | 10/2004 | Nagai et al. | 709/207 |
| 2004/0254810 A1 | 12/2004 | Yamaga et al. | |
| 2005/0028012 A1 | 2/2005 | Amamiya et al. | |
| 2005/0120084 A1 | 6/2005 | Hu et al. | |
| 2005/0154915 A1 | 7/2005 | Peterson et al. | |
| 2005/0234864 A1 | 10/2005 | Shapiro | |
| 2005/0289127 A1 | 12/2005 | Giampaolo et al. | |
| 2006/0224590 A1* | 10/2006 | Boozer et al. | 707/9 |
| 2007/0027953 A1 | 2/2007 | Wu | |
| 2009/0031418 A1* | 1/2009 | Matsuda et al. | 726/21 |
| 2010/0257248 A1 | 10/2010 | Cheah | |
| 2011/0093340 A1 | 4/2011 | Kramer et al. | |

OTHER PUBLICATIONS

Co-pending U.S. Appl. No. 11/643,064, filed Dec. 20, 2006.
Co-pending U.S. Appl. No. 12/267,240, filed Nov. 7, 2008.
Co-pending U.S. Appl. No. 12/267,508, filed Nov. 8, 2008.
Co-pending U.S. Appl. No. 12/267,520, filed Nov. 7, 2008.
Co-pending U.S. Appl. No. 11/734,664, filed Apr. 12, 2007.
Co-pending U.S. Appl. No. 12/715,306, filed Mar. 1, 2010.
Non-Final Office Action Mailed Feb. 6, 2008, in Co-pending U.S. Appl. No. 11/397,817, filed Apr. 3, 2006.
Notice of Allowance Mailed Oct. 15, 2008, in Co-pending U.S. Appl. No. 11/397,817, filed Apr. 3, 2006.
Final Office Action Mailed Feb. 4, 2010, in Co-pending U.S. Appl. No. 11/643,064, filed Dec. 20, 2006.
Non-Final Office Action Mailed May 29, 2009, in Co-pending U.S. Appl. No. 11/643,064, filed Dec. 20, 2006.
Advisory Action Mailed Feb. 24, 2009, in Co-pending U.S. Appl. No. 11/643,064, filed Dec. 20, 2006.
Final Office Action Mailed Dec. 12, 2008, in Co-pending U.S. Appl. No. 11/643,064, filed Dec. 20, 2006.
Non-Final Office Action Mailed Jun. 13, 2008, in Co-pending U.S. Appl. No. 11/643,064, filed Dec. 20, 2006.
Non-Final Office Action Mailed May 21, 2009, in Co-pending U.S. Appl. No. 11/734,664, filed Apr. 12, 2007.
Notice of Allowance Mailed Dec. 3, 2009, in Co-pending U.S. Appl. No. 11/734,664, filed Apr. 12, 2007.
International Search Report of PCT/US2007/088234, Jul. 29, 2008, 1 page.
Written Opinion of PCT/US2007/088234, Jul. 29, 2008, 7 pages.
International Search Report of PCT/US2006/012582, Jun. 19, 2008, 1 pages.
Written Opinion of PCT/US2006/012582, Jun. 19, 2008, 6 pages.

* cited by examiner

INDIVIDUALIZED DATA SHARING

CROSS-REFERENCE TO RELATED APPLICATIONS

The present application is a continuation-in-part (CIP) of U.S. patent application Ser. No. 12/715,306, filed Mar. 1, 2010, which is a continuation of U.S. Pat. No. 7,698,445, filed Dec. 20, 2006, both of which are incorporated by reference. The present application claims priority to U.S. Provisional Patent App. No. 61/183,942, filed Jun. 3, 2009, which is incorporated by reference.

BACKGROUND

Access to data stores or computer-readable mediums is often governed or regulated by permissions. Permissions expressly or impliedly indicate which users may access a data store, and to what extent. Permissions often impliedly or indirectly indicate a user's permitted access by referring to a permissions group of which the user is a member. A permissions group typically includes a set of member data store users with a common degree or level of permitted access; an association with a data store, set of data stores, or part of a data store; and a definition of the common degree or level of permitted access. Permissions often indicate the degree or level of access to an associated data store, set of data stores, or part of a data store with a set of modifiable variables, a set of preset parameters, a reference to a set of modifiable variables, or a reference to a set of preset parameters specifying whether the data entries in the associated storage may be viewed, modified, deleted, or created.

The existing systems address permissions and attributes stored on a server, and accessible to a querying client when the server is online and permissions are satisfied. However, some or all permissions and attributes may be stored on a client's local storage medium, such as hard drive in a workstation, or memory in a cell-phone or PDA, where they are inaccessible when the client is unavailable.

The present computer system and methods may address these and other needs.

SUMMARY

A technique for providing attributes to a client with permission to access those attributes involves receiving a request, and querying an agent for the attributes. A system built according to the technique may include a first client capable of requesting one or more attributes associated with an unavailable second client; one or more client agents storing at least one of the one or more attributes of the second client; a server for receiving the first client's request, the server having a permissions datastore for storing a data entry specifying attribute-sharing permissions between the first client and the second unavailable client; wherein, in operation, the server forwards the request to the one or more agent clients for the one or more attributes associated with the second client.

A method according to the technique may include receiving a query from a first client for one or more attributes associated with a second client; if the first client has permission to access at least one of the one or more attributes associated with the second client, querying an agent client storing data associated with the at least one of the one or more attributes; replying with the at least one of the one or more attributes from the agent client.

A content owner may also be able to grant dynamic permissions to "content blobs." This enables a content owner to grant permissions on the fly.

This summary is provided by way of example, but not limitation. It is intended to give a brief overview of some aspects and embodiments of the invention, but further examples and embodiments are described below.

DETAILED DESCRIPTION

A computer system and methods are described for allowing a first client (e.g., a querying client) to obtain one or more attributes, i.e., personal, privileged, or otherwise sensitive information, associated with a second client (e.g., a queried client) via client agents, where the clients are connected at some point to a server, which grants permissions as specified, at least in part, by the second (queried) client.

The computer system and methods are described below, with reference to the accompanying figures (FIGS.), which are intended to illustrate, rather than limit, the system and methods. The terms "clients" and "subscribers" are used interchangeably, unless noted. A "first" client generally denotes a querying client, e.g., a system subscriber requesting attributes from a queried subscriber. A "second" client generally denotes a queried client, from which an attribute is sought.

I. Server System and Clients/Subscribers

Figure 1:
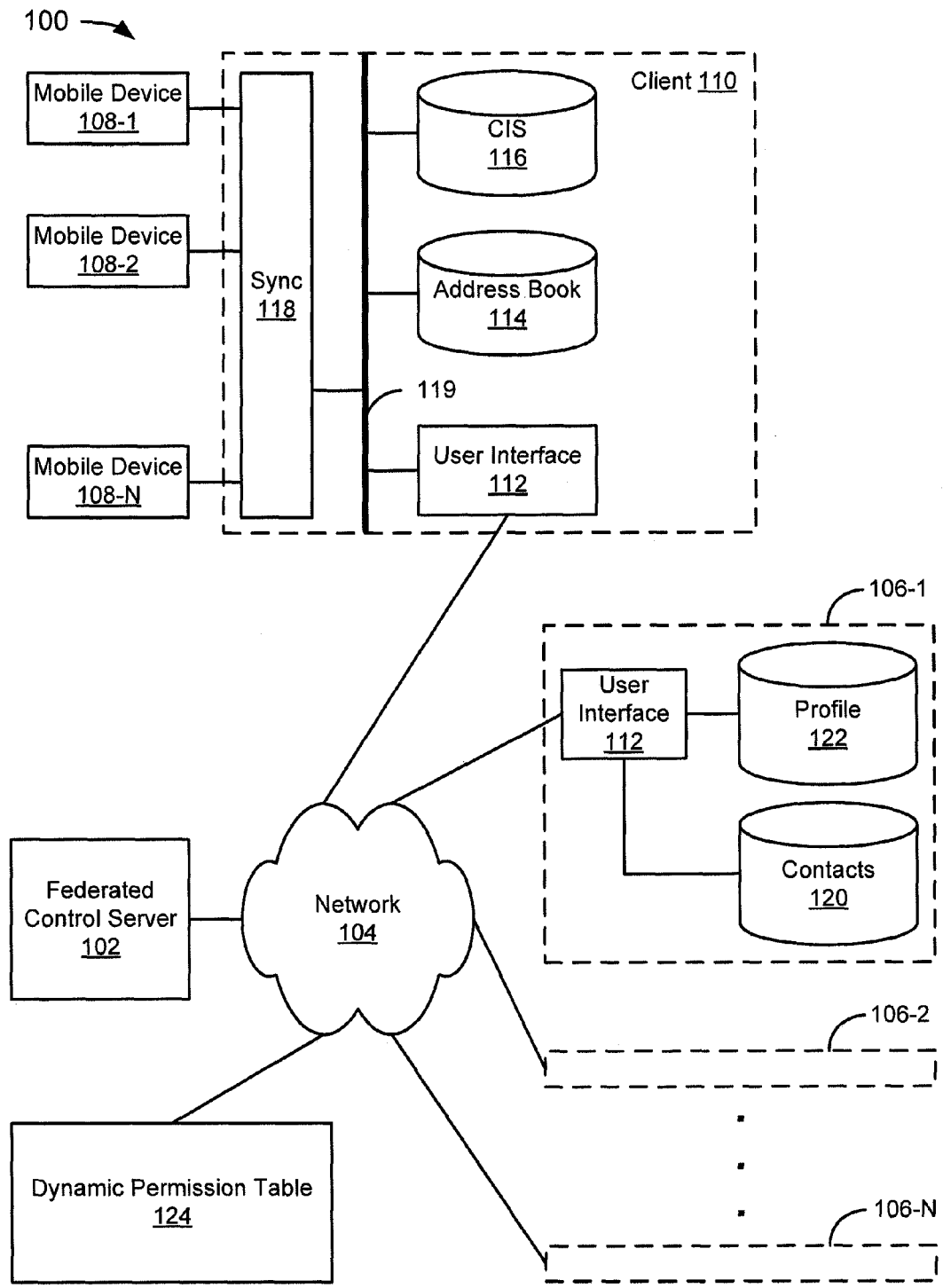
FIG. 1 depicts a conceptual view of a data sharing system.

FIG. 1 depicts a conceptual view of an exemplary system in which the present system and methods may be applied. The system 100 includes a federated control server 102, a network 104, clients 106-1, 106-2, 106-N (referred to collectively as clients 106), mobile devices 108-1, 108-2, 108-N (referred to collectively as mobile devices 108), and a client server 110. Communications between the server 102 and the clients 106 (including the client server 110) can be via secure transactions, such as PKI encrypted transactions. Functionality of a federated control mechanism of the server 102 is described later with reference to FIG. 6.

It will be noted that the client server 110 is distinguished from the clients 106 for illustrative purposes only. Further, elements of the client 110 serve as illustrative embodiments of elements shown in clients 106. For example, the address book 114 serves as an example of a contacts datastore 118 and may be implemented as a proprietary datastore such as a Yahoo® e-mail address book or an internal contact list customized for the system 100. Similarly, the CIS 116 may or may not be an exemplary embodiment of the profile datastore 122 and may comprise, among other things, attributes associated with a subscriber and/or permission settings. In other embodiments, an address book and/or a CIS are optional or left unpopulated.

Figure 2:
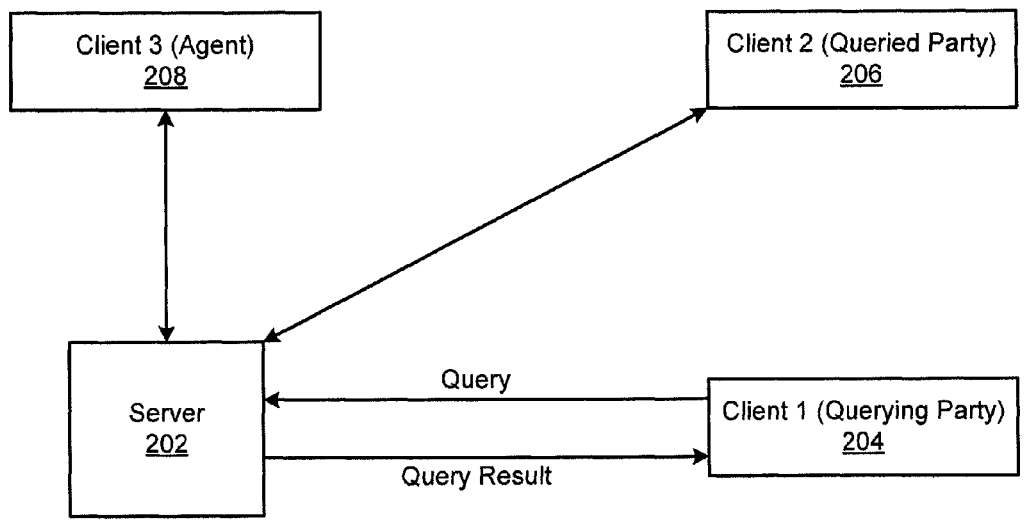
FIG. 2 depicts a system that provides permissions for query access control based on attributes.

FIG. 2 depicts a system 200 that provides permissions for query access control based on attributes. The system 200 may be similar to the system 100 depicted in FIG. 1. The system 200 gives a queried subscriber discretionary control over attributes data via permissions. The system 200 includes a server 202, a first or querying client (party) 204, a second or queried client (party) 206, and one or more client agent 208.

In an illustrative embodiment, the queried client has attribute data on local or mobile storage mediums that is not maintained on the server. Other clients may require such attribute data when the queried client is logged-off, shut-down, or otherwise unavailable. When a first or querying client 204 contacts a server requesting attributes from a second unavailable queried client 206, the request if forwarded to the one or more client agents 208 to obtain the attribute.

The server 202 may comprise one or more servers, in an applicable known or convenient arrangement. In an illustrative embodiment, the server 202 maintains permissions for all of the clients. While the server 202 may store attributes temporarily (or as part of a forwarding process to a querying client), the attributes may be primarily stored in a distributed fashion on the clients so as to, for example, free up resources on the server 202 or avoid centrally stored data. Alternatively, one or more client agents 208 stores permissions and/or attributes of the queried client 206. Thus, in various embodiments, permissions for access to the attribute may be on the server 202, client agent 208, or variations thereof.

Figure 3:
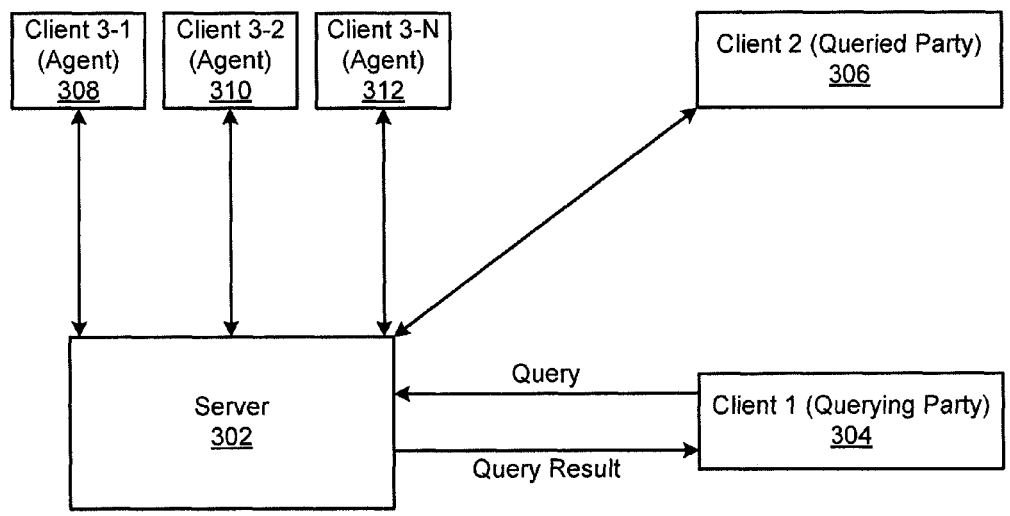
FIG. 3 depicts an embodiment in which there are several client agents in contact with a server.

FIG. 3 depicts an embodiment of the system 300 in which there are several client agents 308, 310, 312 in contact with a server 302, which is additionally in contact with a querying client 304 and a queried client 306. Where a querying client 304 requests an attribute from a queried client 306 via a server, and the queried client 306 is unavailable, the server forwards the request to one or more client agents 308, 310, 312. The client agents may be contacted simultaneously, or in an order specified by the queried client's 306 permissions and attributes, in an order specified by the server 302, or some other order. For example, where the queried client's computer is logged-off or turned off, the server contacts (i.e., forwards the request to) a first client agent 3-1 308, and then client agent 3-2 310, and then client agent 3-N 312, until an available client agent is found. The server 302 may obtain permissions and/or attributes from one or more of the client agents 308, 310, 312, allowing the querying client 304 who satisfies permissions to obtain attributes from a queried client 306, even when unavailable.

II. Client Agent

A client agent is a client that serves as an agent for a queried (or second) client. In this manner, an agency relationship may be established between or among a plurality of clients using a server system, such as the system illustrated in FIG. 1. A client agent may or may not store permissions and/or attributes of a particular queried client and respond to forwarded requests for attributes of the queried client when the queried client is unavailable. A client agent may store attributes and permissions, only attributes, only permissions, attributes and permissions from any number of different clients, encrypted or fragmented attributes and/or permissions, or any combination, thereof. The client agent may have access to the attributes and/or permissions, limited access to data in the attributes and/or permissions, or no access. In many embodiments, the agency relationship is essentially invisible to the client agent. Moreover, the client agent may be no different from any other client in the system (i.e., every client could potentially be a client agent, depending upon the embodiment, implementation, and/or client capabilities).

In some embodiments, attributes associated with a queried client are stored on one or more client agent, while permissions are stored on the server. In some embodiments, attributes and permissions are stored on client agents and implemented by the server. In some embodiments, attributes are stored on client agents and permissions are stored on client agents and the server, implemented by the server. In one embodiment, only permissions may be stored on a client agent, while the attributes are securely stored in a server or computer in communication with the server. Permissions from the queried client or corresponding client agents are required to access these attribute data. Other arrangement will be apparent to one skilled in the art.

In many embodiments, attributes and permissions may be stored in encrypted, fragmented, password or token protected, or other form to prevent client agents and other unauthorized clients from accessing the contents of stored attributes and/or permissions.

One or more client agents may be associated with any one or more clients. For example, each client may store (or host) permissions and/or attributes from a plurality of other clients on a server system. Alternatively or in addition, a particular client's permissions and/or attributes are hosted by a plurality of other clients. Permissions and/or attributes can be grouped, divided, or separated by any distinguishing feature and hosted on different clients to maintain separation.

In an exemplary operation referring to FIG. 3, when a "querying" or "first" client 304 contacts the server 302 requesting attributes of the queried client 306, permissions and/or attributes can be provided by one or more client agents, e.g., 308. This arrangement is of particular value when the queried client 306 is unavailable, such as off-line with respect to the server 302, shut-down, logged off, unplugged, crashed, or otherwise unable to communicate permissions and/or attributes with the server 302.

In this manner, a querying client 304 contacts the server 302, which first attempts to contact the queried client 306, and if unavailable, then contacts the client agent, e.g., 308, for permissions and attributes. If the querying client 304 has permission, the attributes are provided from the client agent, e.g., 308, or from another client agent, e.g., 310, 312. In this manner, personal, privileged, or otherwise sensitive permissions and attributes are made available to querying clients, while being isolated from the server.

III. Permissions and Attributes

Permissions include data entries specifying attribute-sharing permissions between or among different clients of a server system. Permissions may be in a permissions datastore for storing data entries specifying attribute-sharing permissions between clients. The datastore may be on a server, on a client or client agents, or a combination thereof.

In an illustrative embodiment, attributes are stored on a client agent, while permissions are stored on the server or on a computer in communication with the server. Permissions could also be stored on client agents, e.g., while the attributes were in a secured part of the server or computer in communication with the server.

One or more client agents may be associated with any one or more clients. Permissions and/or attributes may be stored on the same client agent or different client agents. Each client may host permissions and/or attributes from a plurality of other clients on a server system. In another example, a particular client's permissions and/or attributes are hosted by a plurality of other clients. Permissions and/or attributes can be grouped, divided, or separated by any distinguishing feature and host on different clients to maintain separation.

Client agents may be workstations, mainframe computers, servers, mobile communication devices, or other computers having or connected to a storage medium. One or a plurality of client agents can be used to host permissions and/or attributes from any number of clients on a server system. Alternatively, a network of client agents supports clients based on location, content, etc. In a further embodiment, some or all clients are client agents, perhaps without being aware, as in the case of a workstation environment where each client stores permissions and/or attributes one or more local mediums.

Client agents may synchronize with the clients they serve, via the server, at periodic intervals, upon demand, in real time, or any combination or variation, thereof, as used for backing-up computer data. Permissions are generally date stamped. Attributes may also be date stamped.

Any or all client permissions and attributes may be stored on one or more client agents in an encrypted form, such that a client agent, while storing the permissions and/or attributes of one or more other clients, cannot access the content.

Examples of particular permissions and attributes are described below. Other embodiments will be apparent to the artisan.

A. Permission Sets

The permission sets controls what attribute sets a client 204, 206, 208 of the system 200 will share with other clients, what attribute sets a client will enable other client to query, whether other client will receive contact information of a client who matches a query request, and the content of query requests a querying client will receive.

Datastores for storing permissions settings may include tables for controlling access to attributes. Such tables can include a user table, an access table, a privacy table, and a query access table.

The user table may include fields for user identification, user name, and other user information. The user table may include a number of attributes including, but not limited to, user name, anniversaries, home address, business address, home phone number, home fax number, cell phone number, business phone number, email addresses, wish lists, clothing sizes, favorite colors, favorite foods, and the like.

Exemplary methods for adding and/or editing the permissions or attributes are described with reference to U.S. Pat. No. 7,461,071, which is incorporated by reference. In an illustrative embodiment, a subscriber adds or edits a set of permissions applicable to one or more other subscribers known to the subscriber as contacts. For example, a subscriber may add a new phone number and allow contacts in the subscriber's address book access to that phone number. The subscriber's address book may be stored in any applicable format including those discussed herein. In another embodiment, a subscriber adds or edits the permissions associated with queries including, but not limited to, the subscriber's privacy status and/or query accessibility.

B. Attribute Sets

The attribute sets comprise entries having attributes associated with the clients of the system 200. The attributes may include, but are not limited to, first name, last name, anniversaries, home address, business address, home phone number, home fax number, cell phone number, business phone number, email addresses, wish lists, clothing sizes, favorite colors, favorite foods, and the like.

Attribute sets may or may not include a contact datastore, which stores information associated with a subscriber's contacts. The contact datastore may comprise a number of data entries wherein each entry includes one or more attributes associated with a contact known to the subscriber. A contact datastore entry may include additional attributes such as the type of contact including but not limited to a business or personal contact. Contact datastores can be divided and stored on any number of clients.

Each attribute in the attribute sets may correspond to one or more permissions settings in the permission sets. A client may manipulate permissions in various configurations in order to restrict the distribution of attributes associated with the client. For example, a client may divide the attributes into categories such as personal and business and designate other subscribers known to the subscriber as a personal or business contact. Consequently, other clients designated as personal contacts are granted permissions to the personal attributes whereas the business contacts will have access only to the business attributes.

In one example, a client may set the permissions associated with an attribute such that one or more other a designated clients will be updated when the client changes the content or value of the attribute. Further, a client may set permissions to restrict what other clients will receive if the client's attributes match the query criteria. For example, the client may select a private status to receive notice of search queries matching the client's attributes and decide whether the querying parties will receive any result from the client.

C. Profile Datastore

The profile datastore 122 may include one or more attributes associated with a subscriber (referring to FIG. 1). For example, a profile datastore may comprise the subscriber's name, home address, e-mail address, favorite food, high school attended, and the like. In one embodiment, the profile datastore 122 may include permission control data associated with each profile attribute. Moreover, both the profile datastore and the contact datastore may be left unpopulated.

D. Access Tables

As described above, datastores for storing permissions settings may include tables for controlling access to attributes. Such tables typically include an access table, a user table, a privacy table, and a query access table.

Access tables may include fields, such as grantor UID, attribute ID, and grantee UID. In one embodiment, a subscriber identified by a grantor UID grants a second subscriber identified by a grantee UID access to certain attributes identified by the attribute ID. For instance, a first subscriber identified by the grantor UID 000001 allows a second subscriber identified by grantee UID 000002 access to the first subscriber's attribute identified by attribute ID 000002. In one embodiment, if a grantor has granted a grantee access to certain attributes, the grantee has query access to those attributes. In another embodiment, if a grantor has granted a grantee access to certain attributes, the grantee receives updates of those attributes when the grantor makes changes to the attributes. The attributes identified by the attribute ID may include personal, privileged, or other sensitive attribute data, e.g., as described herein.

III. Maintaining Secure and Current Permissions and Attributes

Maintaining the accuracy and integrity of data, including permissions and attributes, allows the system and methods to optimally protect and distribute/share client permissions and attributes.

In some embodiments, upon receiving a query from a querying client, a server contacts multiple client agents to obtain permissions and/or attributes. The server may then select the most recent permissions or attributes from among those stored by the client agent, e.g., using a time stamp placed on the relevant information. Time stamps are well known in the art.

Changing permissions and/or attributes may be associated with one or more security features such as, e.g., a one-time password, a confirmation number, a token, and the like. The server may check/verify such security features in selecting the permissions and/or attributes to apply.

Where unauthorized access to the server system or other tampering is suspected, the integrity and/or accuracy of the most recent permissions and attributes may be compromised, or assumed compromised. It may then be preferable to select permissions and/or attributes other than the most recent. In such cases, the server may select the permissions and/or attributes that predate the unauthorized access to, or suspected breach or vulnerability of, the system.

Where identical permissions and/or attributes are stored on multiple client agents, the server may select the permissions and/or attributes that are present on a plurality of client agents but ignores permissions and/or attributes present on one client agent, even if the latter set of permissions and/or attributes is more recent. In this manner, the system and methods verify permissions and prevent a client agent from changing a queried client's permissions and/or attributes, e.g., without consent.

Where different permissions and/or attributes are stored on different client agents, the server may apply any of the above or other selection criteria to each permission or attribute. For example, the server may select certain permission from a workstation or hand-held mobile device based on the most recent date stamp, while selecting other permissions or attributes predating an unauthorized access. Permissions and/or attributes may be selected by many criteria, with a general goal of maintaining accuracy and security of the data.

IV. Operational Embodiments

In one operational embodiment, where the server 302 in FIG. 3 (or client server as shown in FIG. 1) does not store a copy of a queried client's 306 permissions and/or attributes, they may be stored on one or more client agents, 308, 310, 312, i.e., a client that serves as an agent for another client. A querying client 304 may contact the server to request and attribute, such as a customer's contact information, from a second queried client 306. The particular attribute may be on the queried client's 306 local hard drive, where, e.g., an email, media, or other program stores user settings.

Upon finding that the queried client has logged-off his workstation or is other wise unavailable, the server forwards the request to one or more client agents 308, 310, 312 to obtain the most recent permissions for accessing the queried client's address book. The permissions may or may not be, by way of example but not limitation, date stamped. The querying client satisfies the most recent permissions and is allowed to access the address book, which may stored on the same client agent 308 or a different client agent 310, 312. The distribution/sharing of the attribute and identity of the querying client is reported to the queried client, e.g., via email, instant message, text message, etc.

In a second operational embodiment, a querying client 304 contacts the server to request an attribute, such as a customer's contact information, from a queried client 306. The attributes and permissions are on the queried client's 306 local hard drive, the permissions are also on a client agent 308. The queried client 306 workstation is suspected of unauthorized access.

Upon receiving a request for an attribute of a particular querying client 304, the server 302 checks permissions on the queried client's 306 workstation. The permissions were recently updated to allow this particular querying client to access this particular attribute. In response to the unauthorized access, the server 302 is configured to automatically contact a client agent to confirm permissions when a request is made to this queried client. The server 302 contacts the client agent 308 storing the queried client's 306 permissions, which predate the unauthorized access. This particular querying client 304 is not permitted access to the attribute based on the earlier permissions, which the server recognizes as more reliable. The server does not allow access to the attribute.

The request by the querying client can be reported to the queried client, log information can be sent to the server, and the system administrator can be alerted to the suspicious activity. These operations are generally considered optional, even where implementation of such operations is desirable.

In a third operational embodiment, a queried client's 304 local hard drive crashes, causing the loss of important attributes that the queried client neglected to back-up. According to the present system, one or more client agent 306, 310, 312 stores the queried client's 304 information, enabling the queried client to recover the attributes.

In a fourth operational embodiment, a queried client's 304 local hard drive crashes, causing the loss of important attributes, such as address, website links, and account information. These attributes may have been backed-up during the server systems period back-up routine; however, this is Friday evening and IT personnel are unavailable. The present system and methods forwards the request to one or more client agents 306, 310, 312, which store the queried client's 304 information. Via permissions, the queried client is enable to recover the attributes and the queried client, as well as other querying clients, continue to have access to the attributes.

These operation examples illustrate use of the present system but are not intended as limiting. Many further uses will be apparent to one skilled in the relevant art.

V. Exemplary features of further illustrative embodiments

A. Servers

The system generally includes a server to which the clients are connected. In some embodiments, the server 102 (FIG. 1) comprises one or more computer-readable mediums (which includes a medium used by a known or convenient type of storage device that is accessible by a processor). As used in this paper, the term "computer-readable storage medium" is intended to include only physical media, such as memory. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware. The server 102 may include various hardware and/or software components, as described herein. The network 104 may be the internet, an intranet, or some other applicable known or convenient network.

The server may also be part of a distributed computing environment, wherein tasks are performed by remote processing devices linked through a communications network. The server may be coupled to one or more data stores, which may be internal to, directly connected to, and/or a part of the server. In some embodiment, the data stores may be separate or remote from the server and may communicate to the server through a network such as the network 104 illustrated in FIG. 1. The data stores comprise one or more computer-readable mediums, as described above. In one embodiment, the data stores may comprise an SQL database that stores subscriber information, attribute sets, permission sets, and a transactions log for the system.

Permissions may reside on the server, the server along with a client, the server along with one or more client agent, or permutations and combinations, thereof. As used herein, attributes generally reside on storage medium separated from the server.

B. Client Servers

Client servers are common in large server-based network systems, where it is often desirable to distribute server functions among several server devices, which maintaining some level of centralized control. The client server 110 (FIG. 1) may include various hardware and/or software components, as with any server. In some embodiments, the clients 106 include a user interface 112, a contact datastore 120, and a user profile datastore 122. The user interface 112 facilitates the interaction between the system and a subscriber of the system. The subscriber may use the interface 112 to update profile attributes or contact information. The user interfaces may include, but is not limited to, an internet/web interface, a mobile phone and the like. As noted elsewhere, features described with reference to any one of the clients 106, 110 may be applicable to all or a subset of the clients 106, 110.

C. Mobile Devices

The server 202 may communicate with handheld devices, multiprocessor systems, microprocessor-based or programmable consumer electronics, network PCs, minicomputers, mainframe computers, wireless devices, and the like. One or more permissions and/or attributes may be stored on such devices. One or more permissions and/or attributes may be also be requested from such devices.

The mobile devices 108 may include various hardware and/or software components, as described herein. In many embodiments, clients 106 may be mobile devices. The 108 synch with the client 110 in a manner that is known in the computer arts. For example, the mobile device 108-1 may be by way of example but not limitation a mobile phone, and the mobile device 108-2 may be by way of example but not limitation a PDA, both of which can synch with, by way of example but not limitation, a Mac OS X Address book on a user's computer (e.g., the client 110) through an iSync mechanism, which is known in the computer arts. The client 110 would then update local datastores based upon the results of the iSync. Comparable technologies exist for various address book types and various operating systems, including but not limited to Blackberry and Palm.

VI. Dynamic Permission Table

In the example of FIG. 1, the system 100 includes a dynamic permission table 124. In an embodiment that includes content blobulation (see, e.g., FIGS. 4-6), the dynamic permission table 124 can include a record of permissions granted dynamically. The dynamic permission table can be part of a permission table in the server 120, or it could be stored in a distributed fashion, or stored on some other server. In a system that enables reblobulation, for a machine that is being repopulated with attributes that are stored in a distributed manner, the machine can obtain the attributes automatically from users that accepted dynamic permissions, or the users who accepted dynamic permissions could be requested to provide the attributes preferentially over those users who simply have passive permission to access the attributes.

Figure 4:
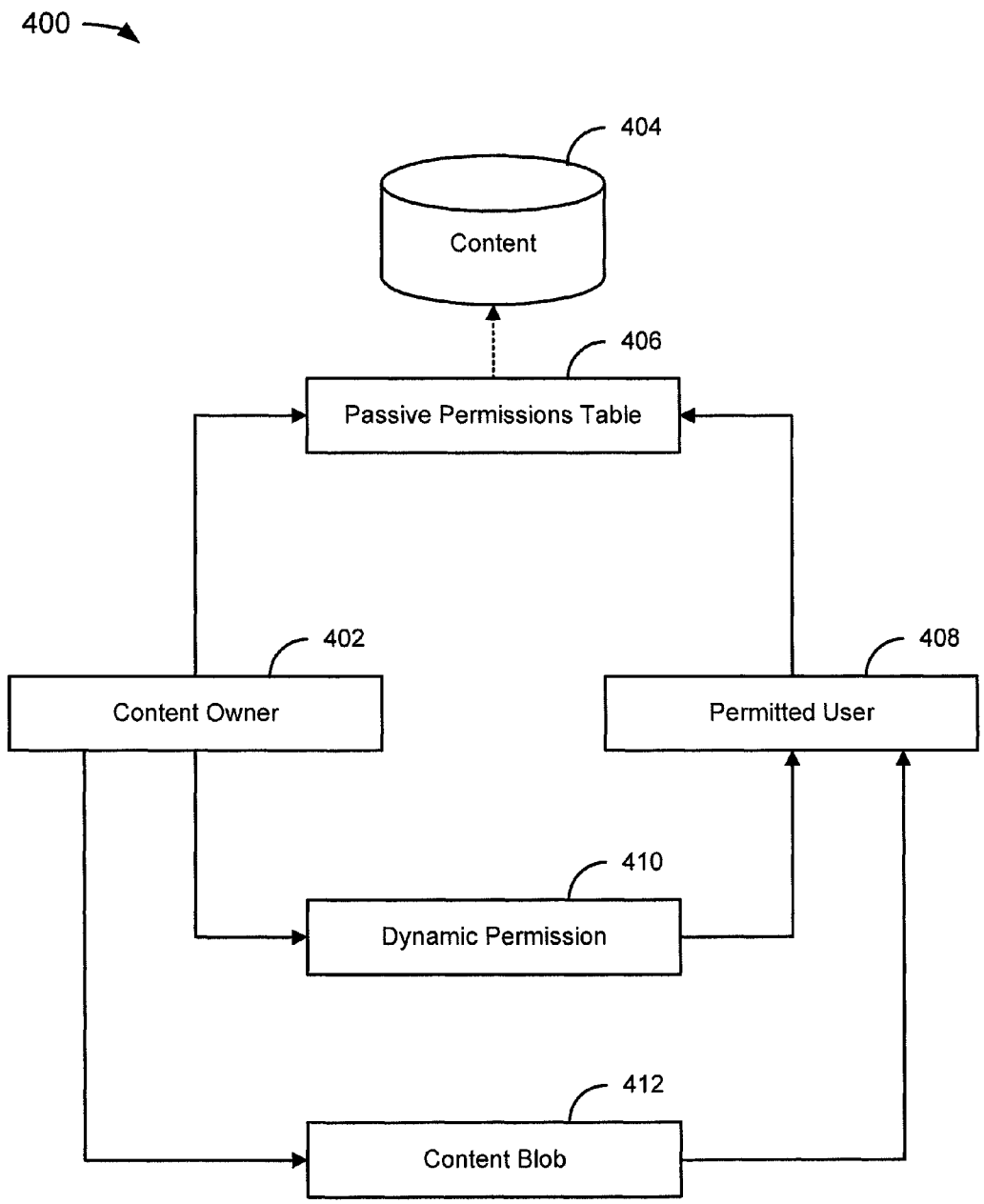
FIG. 4 depicts a conceptual view of a system for individualized data sharing.

FIG. 4 depicts a conceptual view of a system 400 for individualized data sharing. The system 400 includes a content owner 402, a content datastore 404, a passive permissions table 406, a permitted user 408, a dynamic permission 410, and a content blob 412.

In the example of FIG. 4, the content owner 402 can grant permissions to content in the content datastore 404. Permissions are stored in the passive permissions table 406, which can be stored at a permissions server (not shown). The passive permissions table 404 can be centralized or distributed, which means the permissions server can be implemented in a centralized or distributed fashion. For example, the passive permissions table 406 can be stored at a server or the content owner could maintain a subset of the table locally.

The content datastore 406 can also be centralized or distributed. Content in the content datastore 406 can be stored locally at one or more machines of the content owner 402. In some cases, all of the content of the content datastore 406 is stored at one or more machines of the content owner 402, though, particularly if a machine of the content owner 402 goes down, it may be desirable to store some or all of the content of the content datastore 404 elsewhere. Depending upon the implementation, it may also be the case that a content owner does not store any, or only stores a subset, of the data in the content datastore 404 on a machine of the content owner 402. In a specific embodiment, the content datastore 406 includes content saved on other machines as well, such as at a machine of the permitted user 408. Redundancy of content of the content datastore 404 can facilitate recovery in the event of data loss at a machine of the content owner 402, a machine of the permitted user 408, or at other machines (typically, though not necessarily, only machines that have permission to the content).

The permitted user 408 is able to access relevant content of the content datastore 404 if permissions in the passive permissions table 406 are set appropriately. Content could have different permissions for different portions of the content datastore 404. For example, the content owner 402 could grant permission to view a work phone number to one user and permission to view a home phone number to another. In order to keep the content datastore 404 manageable, the fields can be defined explicitly. One or more "catch-all" fields are also possible, but an implementation that at some arbitrary point allows permissions to be associated with any particular field is probably desirable so that the content owner 402 can grant permissions with a desired granularity. For example, the content owner 402 might find that there are too few or too many "catch-all" fields, and redefine fields to achieve the desired granularity. In some implementations, per-field granularity may or may not be possible despite the apparent advantages. There can be advantages to grouping fields for ease of management, either as a system design or in accordance with configurable user preferences.

Advantageously, the content owner 402 can grant active permissions on the fly. These dynamic permissions can be granted whenever a permitted user is to be granted access to a content blob. In the example of FIG. 4, the dynamic permission 410 represents one such grant of permission to the permitted user 408 for the content blob 412. As is illustrated, the dynamic permission 410 and the content blob 412 are sent from the content owner 402 to the permitted user 408. The content blob 412 can include a transfer of the content itself, or a link to the content associated with the content blob 412.

It should be noted that the permitted user 408 may or may not have permissions set in the passive permissions table 406 for content in the content datastore 404. However, there are advantages to sending the dynamic permission 410 to the permitted user 408, where the permitted user 408 is already permitted to access content in the content datastore 404 through the passive permissions table 406; so this is presumed in the example of FIG. 4. For example, with both active and passively granted permissions, content can be automatically updated when the content is changed, assuming the system is so configured and/or the permitted user 408 accepts automatic updates. As a specific example, when the content owner 402 adds new pictures to a photo album to which the permitted user 408 has access, the content owner 402 can send the dynamic permission 410 and the content blob 412 (including either the new pictures or a link to the photo album).

Reblobulation is also possible by maintaining dynamic permission receipts, and sending content to the owner upon request. For example, the permitted user 408 could maintain a receipt of the dynamic permission 410, stored locally in association with the content blob 412 or provided to a dynamic permission table in a remote location. If the content owner 402 loses content associated with the content blob 412, either because it is deleted or a machine fails, the content owner 402 can request reblobulation from the permitted user 408. Depending upon the implementation, the permitted user 408 could provide the content automatically upon request, either by explicitly granting permission to reblobulate by accepting the dynamic permission 410 or by design (perhaps without the permitted user 408 being given a choice to assist with reblobulation). In this way, those users that accepted dynamic permissions are the pool from which agents (see, e.g., FIGS. 2 and 3) can be drawn. Alternatively, the permitted user 408 could grant reblobulation permission upon receiving a request for reblobulation, either by requiring approval upon receipt of the dynamic permission 410 or by design (so that the permitted user 408 is always aware of requests for reblobulation). Thus, sharing content is also a convenient backup for the content.

In an example where the content owner 402 loses data and must reblobulate, the content owner 402 can access the passive permissions table 406 to find out who has access to content in the content database 404. Depending on the implementation of the system 400, the content owner 402 can assume that the permitted user 408 received the dynamic permission 410 at some previous time, and request reblobulation from the permitted user 408.

In another implementation, the passive permissions table 406 can include a field associated with an attribute that indicates whether dynamic permission was granted for the attribute. In this implementation, the content owner 402 would modify the passive permissions table 406 accordingly (either by writing to the table or reporting to a permission server that writes to the table), or the permitted user 408 would report receipt and/or acceptance of the dynamic permission 410 to a permission server that writes to the table. (It is theoretically possible that the permitted user 408 could write to the passive permission table 406 directly, but this is probably undesirable given a presumed security constraint of having the content owner 402 control permissions.) With this implementation, the content owner 402 could, for example, only, or preferentially, request reblobulation from users who received and/or accepted dynamic permissions. Thus, it is possible for the permitted user 408 to be granted passive permission (and not assist in reblobulation) or implicitly volunteer to assist with reblobulation by accepting the dynamic permission 410. Also, the content owner 402 can decide whether to grant permissions based upon whether the permitted user 408 agrees to assist with reblobulation by accepting the dynamic permission 410. That is, some permissions may require acceptance of the dynamic permission 410, while others might not. Advantageously, the backup of content enables automatic restoration. That is, restoration that happens immediately upon startup of an appropriate machine from a user that accepted dynamic permission to the content (perhaps including other machines of the content owner 402).

Sharing can be non-exclusive or exclusive, though exclusive sharing may require significant modifications to applications. For example, if you share a Word document with a user, the user is typically able to save and transmit the document as desired. With appropriate configurations to an application, however, the document can be made "unsavable" in some other format, or have other characteristics. This may be desirable in cases where other users can request reblobulation of content to which the user is permitted and the permitted user 408 serves as an agent.

Figure 5:
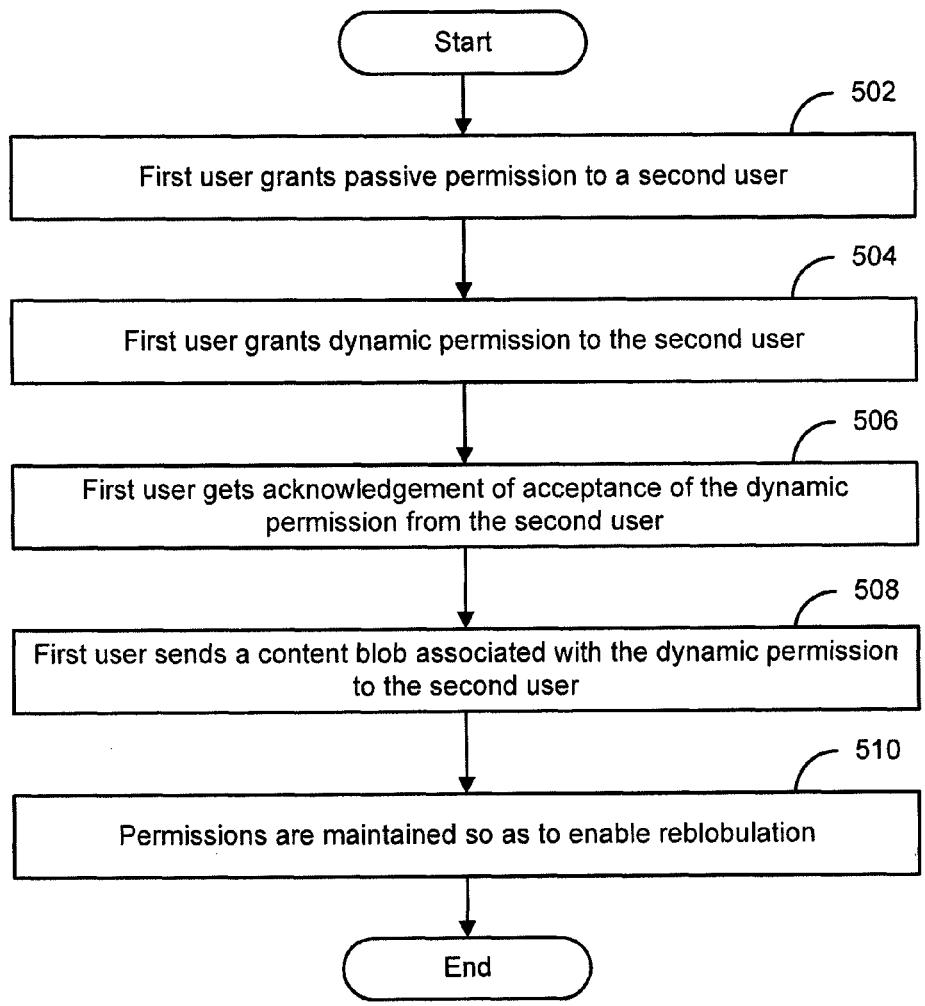
FIG. 5 depicts flowchart of a method for utilizing dynamic permissions for content.

FIG. 5 depicts flowchart 500 of a method for utilizing dynamic permissions for content. The method is organized as a sequence of modules in the flowchart 500. However, it should be understood that these and modules associated with other methods described herein may be reordered for parallel execution or into different sequences of modules.

In the example of FIG. 5, the flowchart 500 starts at module 502 where a first user grants passive permission to a second user. The granting of passive permission can include updating, or causing to be updated, a passive permission table. The exact implementation of the passive permission table is configuration-specific, but should include sufficient data to enable an attribute to be associated with a permission granted to a user. The granularity of the attributes is implementation- and/or configuration-specific, but it is expected that a content owner will have the ability to identify content with a relatively high degree of granularity. Permissions can be associated with a single user or groups of users, and could be associated with no user at all if the permissions table includes more attributes than a content owner has granted permission for (though an implementation could require that the content owner grant permission in order to have an entry in the passive permission table). Generally, an attribute can be identified with an attribute ID and users can be identified with (individual and/or group) UIDs, though the identification can be in any applicable known or convenient form. The content owner will normally have control over the passive permissions table (or a portion thereof if multiple content owners are represented in the passive permissions table), but the passive permissions table need not be stored on a machine of the content owner. For example, the passive permission table could be stored on a centralized or distributed permission server having an applicable known or convenient configuration or functionality.

In the example of FIG. 5, the flowchart 500 continues to module 504 where a first user grants dynamic permission to the second user. The first user can send the dynamic permission directly to the second user in a known or convenient manner (e.g., an electronic message). The first user can also trigger some other device, such as a permission server or some other server, to send dynamic permission on the first user's behalf. Although the first user is the source of the dynamic permission, it is implementation- and/or configuration-specific where the dynamic permission is generated or through which devices the permission passes to reach the second user. Since the first user is the source, it is intended to be implicit that the first user generating and sending the dynamic permission includes generating and/or sending on behalf of or in accordance with instructions of the first user. By dynamic, it is intended to mean that the first user grants permission that can be received in due course by active attempts to send a notification to the second user. For example, the dynamic permission could be sent in an email. It should be understood that whether the second user actually sees the dynamic permission will depend upon whether the second user checks the relevant inbox (e.g., an email application). Also, if the medium through which the permission is sent is disabled for some reason, including if the delivery requires that a particular machine of the second user be on, multiple attempts can be made to deliver the dynamic permission. Alternatively, a notification of dynamic permission could be sent, requiring the second user to take some action to view or accept the dynamic permission, such as by logging onto an account. In an embodiment, the order of modules 502 and 504 can be switched, though this is generally true of any applicable module in the flowcharts illustrating methods in this paper.

In the example of FIG. 5, the flowchart 500 continues to module 506 where the first user gets acknowledgement of acceptance of the dynamic permission from the second user. It is possible that a system may be implemented such that module 506 is omitted or optional, but this eliminates some of the advantages of utilizing a dynamic permission. For example, the first user may not know if the second user is aware of the grant of permission. Also, in an implementation that enables reblobulation of content that was sent to users who accept dynamic permission, it would be desirable for the first user (or a server that acts on behalf of the first user) to be aware that the second user is able to participate in a reblobulation attempt. It is implicit that a server that receives the acknowledgement and acts on behalf of the first user means that the first user gets the acknowledgement, even if the first user does not explicitly receive the acknowledgement. Thus, "first user gets acknowledgement" is intended to include explicit receipt by the first user and receipt on behalf of the first user. The failure to get acknowledgement could be reason to, or could automatically result in, rescinding passive permission to the content and/or related content (e.g., failure to receive acknowledgement of dynamic permission to a photo could result in passive permission to the photo being rescinded and/or passive permission to a photo album with which the photo is associated being rescinded). In an embodiment, the order of module 502 could be after that of module 506, though this is generally true of any applicable module in the flowcharts illustrating methods in this paper, and could be dependent upon getting acknowledgement.

In the example of FIG. 5, the flowchart 500 continues to module 508 where the first user sends a content blob associated with the dynamic permission to the second user. Here, what is intended by "associated with the dynamic permission" is that the dynamic permission is to content in, or in a link that is in, the content blob. The use of the word "blob" is intended to indicate that any applicable known or convenient content could be used. In an embodiment, the modules 506 and 508 could be combined, though this is generally true of any applicable module in the flowcharts illustrating methods in this paper, such that the dynamic permission and the content blob are sent simultaneously.

In the example of FIG. 5, the flowchart 500 ends at module 510 where permissions are maintained so as to enable reblobulation. One advantage of requiring acceptance of dynamic permissions is that, if the system is so configured, the acceptance can indicate that the second user is willing to aid reblobulation. Thus, by sharing content, the first user can essentially backup the content, and reblobulate a machine if their content is locally lost. Another advantage is that the second user will not have old data reblobulated with new data without first obtaining dynamic permission to the new data. So, for example, the second user could archive old data before receiving dynamic permissions to new data that might overwrite the old. Also, some users may not be comfortable with allowing a system to reach inside their machine without permission, at least in part due to concerns about privacy; so the second user may want the comfort of knowing that they do not have to accept dynamic permission to content that will overwrite their data. That said, acceptance of dynamic permission could include, depending upon the implementation, permission to update the content at a later time so as to keep shared data consistent and up-to-date. It may be noted that reblobulation can also be accomplished using passive permissions, since the passive permissions also identify users who have access to content.

Figure 6:
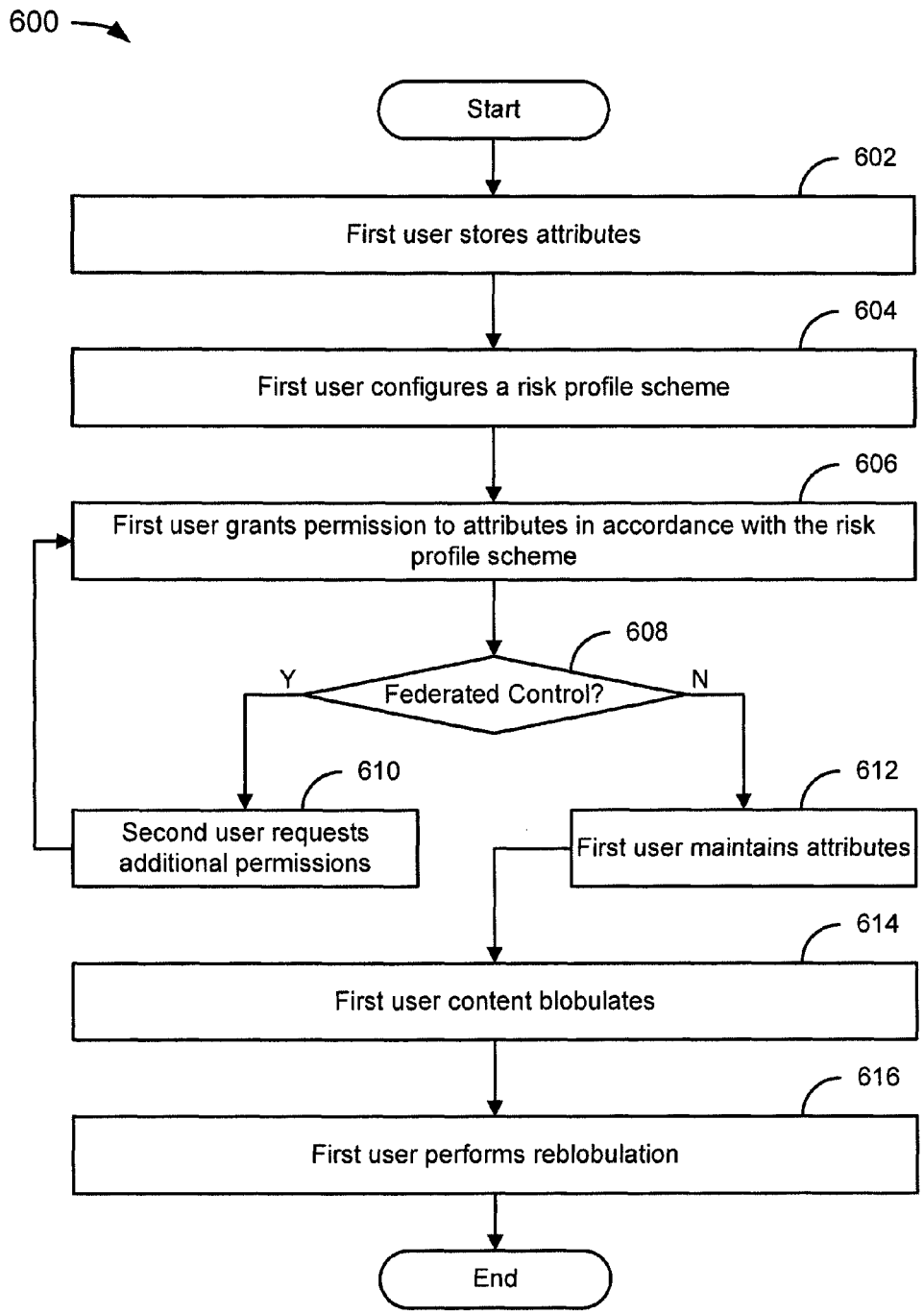
FIG. 6 depicts a flowchart of an example of a method for self-management of personal information sharing.

FIG. 6 depicts a flowchart 600 of an example of a method for self-management of personal information sharing. In the example of FIG. 6, the flowchart 600 starts at module 602 where a first user stores attributes. This can include storing any attributes that the first user wishes, including that which the first user has no intention of sharing. The user is given control over their own information, which is an advantage of non-centralized storage of personal information.

In the example of FIG. 6, the flowchart 600 continues to module 604 where the first user configures a risk profile scheme. The configuration of a risk profile scheme involves, for example, setting secret information permissions to never, such that the information is not shared with anyone; setting private information permissions, such that only specific entities have access to the information; setting personal information permissions, such that only (real) friends have access to the information; setting business information permissions, such that business contacts have access to the information; and setting public information settings, such that anyone has access to the information. Secret information can be shared with other devices that the first user owns. For example, the first user might share information between the first user's desktop and mobile phone. Private information might include sensitive data that is only shared when it is necessary. For example, a bank might require that you know your account number. So you might share the account number with the bank, and perhaps routing information with a merchant or other party. Personal information might include that which you want your friends to know, such as your home phone number or birthday. Business information might include that which you want business contacts to know, such as your mobile phone number or office address. Public information settings might include your name, if you want people to be able to search for you. Advantageously, these categories are simply examples, and the first user can have many more categories, and assign permissions for particular attributes on an as-needed basis (e.g., Mother's maiden name when that is a required access code). Thus, configuring the risk profile scheme is not a permanent setting: the first user can dial privacy up, dial privacy down, and distribute attributes as a group or individually as desired. The system can facilitate almost any number of levels of "friend" based upon how much information a user wants to share.

In the example of FIG. 6, the flowchart 600 continues to module 606 where the first user grants permission to attributes in accordance with the risk profile scheme. The permissions can be granted to an individual, a group, a community, or some other entity. The party to which permissions are granted can be identified explicitly by the first user or the party can contact the first user after the first user shares public attributes that enable the second user to find the first user. Since the first user grants permissions to attributes that are initially stored locally, and which can be stored in a distributed fashion as the attributes are distributed, the attributes can be stored in a scalable large, networked, distributed community. The technique facilitates, e.g., a stateless, independently managed permission model for low latency exchanges that is not disruptive to other data models. No user data need be stored by a federated exchange system, which can be configured to cache "in-flight" transactions only and can be deployed inside a client data center without data being stored at an external vendor. Advantageously, the technique can enable the deployment of a single, secure federated exchange for personal or business information that is distributed, implements changes to data automatically, and ensures data validity is not an issue.

In the example of FIG. 6, the flowchart 600 continues to decision point 608 where it is determined how the first user responds to federated control. The federated mechanism could be implemented by the community, or by a third party exchange service, such as the exchange service that facilitates the creation of the distributed attribute system. The federated mechanism could be triggered by going to a particular website, or indicating membership in a particular community in such a manner that the federated control mechanism is aware of the membership (e.g., a federated exchange server could enable the first user to check boxes associated with parties that are under federated control). If it is determined that the first user responds affirmatively to federated control (608-Y), then the flowchart 608 continues to module 610 where the second user requests additional permissions. The federated control mechanism can include what amounts to an interface to a particular community that has certain requirements for login. For example, if the first user wishes to share attributes with a social network, the social network may have username and password requirements. So the federated control mechanism, which knows the requirements, may request that the first user provide a username and password (the user could also grant permission to a username and password, if the attributes are already in the first user's profile, but the federated mechanism would not necessarily be aware of such data). Presumably, if the first user refused to grant permissions to the username and password attributes, the first user would be required to login normally when visiting the online community.

The federated control mechanism can also request permissions to optional attributes. For example, a user may be a member of an airline mileage program that gives miles for staying at certain hotels. If the user becomes a member of a hotel community, the federated mechanism could request the airline mileage program number, which can be used to credit the first user for staying at the hotel. An online social network might have options for a great deal of personal information, which the federated control mechanism could request permissions to. Whether the permissions are granted would be up to the first user, and the response could be essentially automated to grant permission to public information when requested, and refusing to grant permission to more private attributes, unless the permission is explicit.

It is also possible to architect federated control mechanisms between communities. In such a case, communities could automatically share certain attributes with one another. It may be desirable to enable the first user to grant non-transferable permissions, if such an exchange of data is not desired. A less intrusive architected federated control mechanism between communities could simply enable communities to recognize certain attributes as the same. For example, if two communities can store the birthday of the first user, the birthday attribute could be recognizable by both, either because the communities make certain that their internal structure can accomplish this goal, or because the federated mechanism creates an alias for the birthday attribute that is recognizable to a community, and grants permission to the community to the alias. In this way, the first user could share the birthday attribute with a community that is under federated control, and the attribute would be recognized as a birthday. Advantageously, this enables the first user to apply one permission model across their entire digital world (or at least that portion that is under federated control), including communities (e.g., Yahoo, Ebay, MSN, Terra/Lycos, LinkedIn), corporations (e.g., banks, utilities, corporate HR/payroll), carriers (e.g., Vodaphone, Cingular, O2, DoCoMo), professionals (e.g., lawyers, doctors, accountants, consultants), networked individuals (e.g., mobile individuals with a connected desktop, laptop, mobile, or PDA), etc. A federated control mechanism can facilitate an interchange of rules and data via standards, such as REST, XML, and HTTPS via documented APIs.

In the example of FIG. 6, the flowchart 600 returns to module 606 where the first user grants permission to attributes in response to the request for additional permissions. If a community does not have a federated control mechanism, or if the exchange service does not know of the community requirements, then the first user would not be able to respond affirmatively to federated control; or if the first user already provided the necessary or optional permissions, or is not interested in responding to the federated control mechanism (608-N), then the flowchart 600 continues to module 612 where the first user maintains attributes. Maintaining attributes can includes storing additional attributes (602), reconfiguring the risk profile scheme (604), and granting additional permissions in accordance with the risk profile scheme (606). Changes to attributes that are stored by others can be pushed from the first user, or the parties might receive notices that updates are available, and the parties can pull the new attribute values.

In the example of FIG. 6, the flowchart 600 continues to module 614 where the first user content blobulates. Content blobulation is intended to mean that the first user grants dynamic permissions to content blobs. It may be noted that a system could require or optionally enable content blobulation for all attributes, though it would be relatively hard to require blobulation of all attributes if the attributes are public (since you would presumably have to send the attributes to everyone in the public domain). So the choice of whether and how much blobulation is implemented can have an impact on how much customization is possible with the risk profile scheme.

No presumption is made to how much blobulation must be or can be used in the example of FIG. 6. Sharing information can build a community, but controlling the information, including whether data is received through the distribution channels of the system, can build trust. By first forming a connection via a federated exchange, then receiving content blob updates from those with whom connections are formed, the federated exchange can help build trust among users.

Content blobulation can be conditional based upon various factors, such as location, receiving a new level in a loyalty program, etc. So a user can be updated based upon factors unique to them, rather than or in addition to the first user updating old attributes. In addition to enabling the first user to distribute attributes and essentially back them up in a distributed fashion, automatic updates can be particularly advantageous for, e.g., customer service contact information, or to provide updates from companies without an active customer service organization when content is added to a website or other datastore, or to share loyalty program information, such as from merchants and airlines. The sharing of information can be based upon various data, such as current location of a mobile device or known schedules (e.g., flights to Paris from JFK or arriving at a hotel could trigger localized updates from nearby businesses). Since users control their personal information, if a user shares information with, e.g., Starbucks, Starbucks can send localized updates or let the first user know when they are nearby. In this way, content blobulation can act as a form of advertising, in addition to simply ensuring that contacts have the most up-to-date contact information. It is not even necessary that content blobulation provide new data, depending upon how the federated system is implemented. For example, a user might be able to reblobulate with old data simply to get a user's attention, though this might be undesirable, depending upon the goals of the federated system.

Content blobulation can be used to provision clients of, e.g., a company. For example, when a computer is set up for an employee, the computer can be blobulated using other computers in the network. Generally, provisioning a computer entails the use of a server that includes company information, but that is not necessarily a requirement, and a distributed datastore is a workable option.

In the example of FIG. 6, the flowchart 600 ends at module 616 where the first user performs reblobulation. Blobulation can enable reblobulation (or zero-touch restoration without backup) by recalling the computers to which content has been blobulated. For example, if the first user's computer is destroyed and the first user obtains a new computer, simply by logging into the federated system, the new computer can be populated with all of the data that was shared. Where content blobulation was dynamic (and required other users to accept the content blob), the federated system can require that the recipients of the content blob reciprocate by providing the content blob when requested by a party with permission. In this example, the first user is the party with permission. It may be noted that although the flowchart 600 ends with reblobulation, conceptually the flowchart 600 could return to module 612 (or some other module) and continue with maintenance of attributes.

Figure 7:
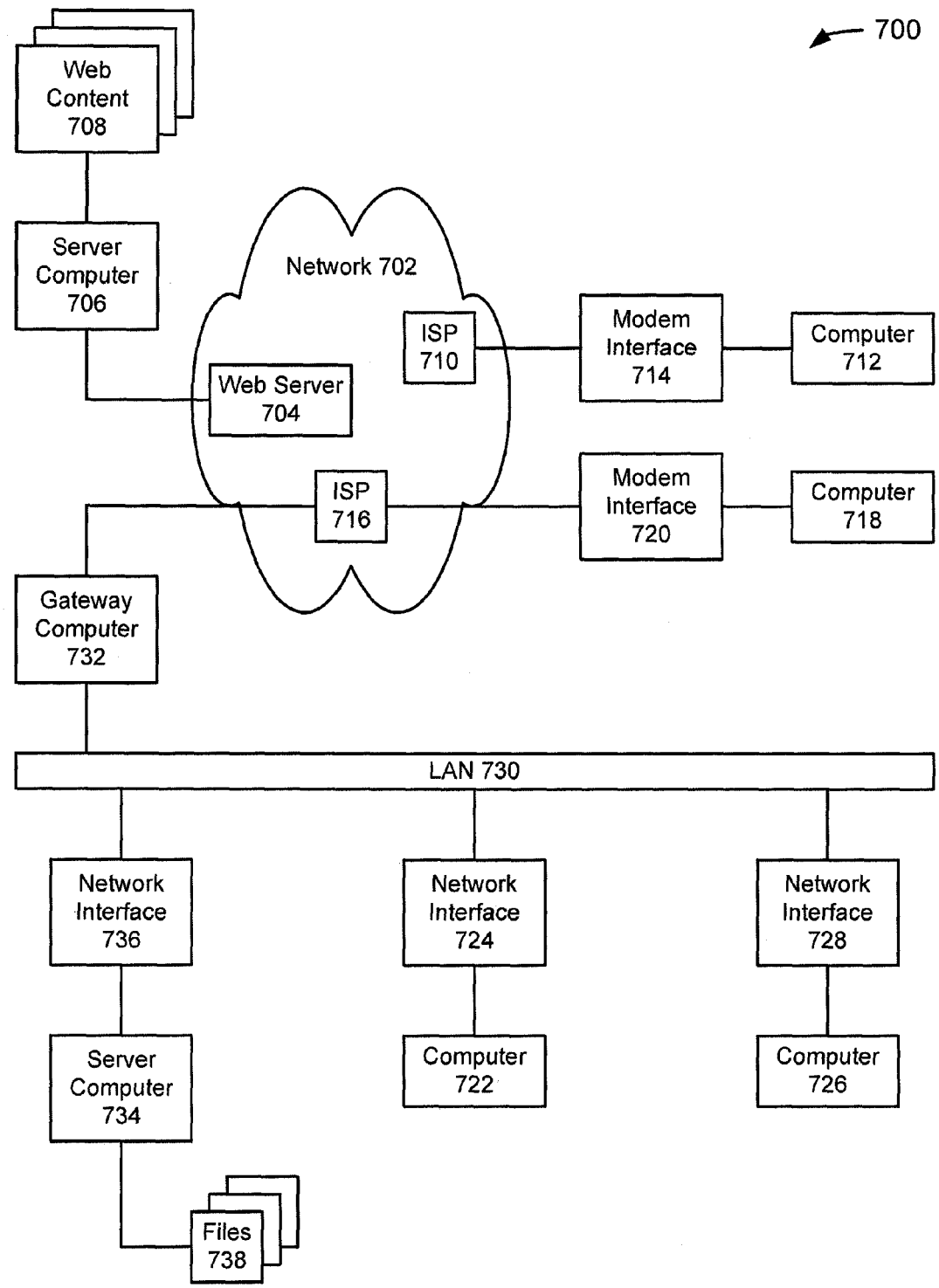
FIG. 7 depicts a system on which a framework for individualized data sharing can be implemented.

FIG. 7 depicts a system on which a framework for individualized data sharing can be implemented. FIG. 7 depicts a networked system 700 that includes several computer systems coupled together through a network 702, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well known to those of skill in the art.

The web server 704 is typically at least one computer system which operates as a server computer system and is configured to operate with the protocols of the world wide web and is coupled to the Internet. The web server system 704 can be a conventional server computer system. Optionally, the web server 704 can be part of an ISP which provides access to the Internet for client systems. The web server 704 is shown coupled to the server computer system 706 which itself is coupled to web content 708, which can be considered a form of a media datastore. While two computer systems 704 and 706 are shown in FIG. 7, the web server system 704 and the server computer system 706 can be one computer system having different software components providing the web server functionality and the server functionality provided by the server computer system 706, which will be described further below.

Access to the network 702 is typically provided by Internet service providers (ISPs), such as the ISPs 710 and 716. Users on client systems, such as client computer systems 712, 718, 722, and 726 obtain access to the Internet through the ISPs 710 and 716. Access to the Internet allows users of the client computer systems to exchange information, receive and send e-mails, and view documents, such as documents which have been prepared in the HTML format. These documents are often provided by web servers, such as web server 704, which are referred to as being "on" the Internet. Often these web servers are provided by the ISPs, such as ISP 710, although a computer system can be set up and connected to the Internet without that system also being an ISP.

Client computer systems 712, 718, 722, and 726 can each, with the appropriate web browsing software, view HTML pages provided by the web server 704. The ISP 710 provides Internet connectivity to the client computer system 712 through the modem interface 714, which can be considered part of the client computer system 712. The client computer system can be a personal computer system, a network computer, a web TV system, or other computer system. While FIG. 7 shows the modem interface 714 generically as a "modem," the interface can be an analog modem, isdn modem, cable modem, satellite transmission interface (e.g. "direct PC"), or other interface for coupling a computer system to other computer systems.

Similar to the ISP 714, the ISP 716 provides Internet connectivity for client systems 718, 722, and 726, although as shown in FIG. 7, the connections are not the same for these three computer systems. Client computer system 718 is coupled through a modem interface 720 while client computer systems 722 and 726 are part of a LAN 730.

Client computer systems 722 and 726 are coupled to the LAN 730 through network interfaces 724 and 728, which can be ethernet network or other network interfaces. The LAN 730 is also coupled to a gateway computer system 732 which can provide firewall and other Internet-related services for the local area network. This gateway computer system 732 is coupled to the ISP 716 to provide Internet connectivity to the client computer systems 722 and 726. The gateway computer system 732 can be a conventional server computer system.

Alternatively, a server computer system 734 can be directly coupled to the LAN 730 through a network interface 736 to provide files 738 and other services to the clients 722 and 726, without the need to connect to the Internet through the gateway system 732.

FIG. 7 depicts a computer system 740 for use in the system 700. The computer system 740 may be a conventional computer system that can be used as a client computer system or a server computer system or as a web server system. Such a computer system can be used to perform many of the functions of an Internet service provider, such as ISP 710.

In the example of FIG. 7, the computer system 740 includes a computer 742, I/O devices 744, and a display device 746. The computer 742 includes a processor 748, a communications interface 750, memory 752, display controller 754, non-volatile storage 756, and I/O controller 758. The computer system 740 may be couple to or include the I/O devices 744 and display device 746.

The computer 742 interfaces to external systems through the communications interface 750, which may include a modem or network interface. It will be appreciated that the communications interface 750 can be considered to be part of the computer system 740 or a part of the computer 742. The communications interface can be an analog modem, ISDN modem, cable modem, token ring interface, satellite transmission interface (e.g. "direct PC"), or other interfaces for coupling a computer system to other computer systems.

The processor 748 may be, for example, a conventional microprocessor such as an Intel Pentium microprocessor or Motorola power PC microprocessor. The memory 752 is coupled to the processor 748 by a bus 760. The memory 752 can be dynamic random access memory (DRAM) and can also include static ram (SRAM). The bus 760 couples the processor 748 to the memory 752, also to the non-volatile storage 756, to the display controller 754, and to the I/O controller 758.

The I/O devices 744 can include a keyboard, disk drives, printers, a scanner, and other input and output devices, including a mouse or other pointing device. The display controller 754 may control in the conventional manner a display on the display device 746, which can be, for example, a cathode ray tube (CRT) or liquid crystal display (LCD). The display controller 754 and the I/O controller 758 can be implemented with conventional well known technology.

The non-volatile storage 756 is often a magnetic hard disk, an optical disk, or another form of storage for large amounts of data. Some of this data is often written, by a direct memory access process, into memory 752 during execution of software in the computer 742. One of skill in the art will immediately recognize that the terms "machine-readable medium" or "computer-readable medium" includes any type of storage device that is accessible by the processor 748 and also encompasses a carrier wave that encodes a data signal.

Objects, methods, inline caches, cache states and other object-oriented components may be stored in the non-volatile storage 756, or written into memory 752 during execution of, for example, an object-oriented software program. In this way, the components illustrated in, for example, FIGS. 1-6 can be instantiated on the computer system 740.

The computer system 740 is one example of many possible computer systems which have different architectures. For example, personal computers based on an Intel microprocessor often have multiple buses, one of which can be an I/O bus for the peripherals and one that directly connects the processor 748 and the memory 752 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 752 for execution by the processor 748. A Web TV system, which is known in the art, is also considered to be a computer system according to the present invention, but it may lack some of the features shown in FIG. 8, such as certain input or output devices. A typical computer system will usually include at least a processor, memory, and a bus coupling the memory to the processor.

In addition, the computer system 740 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 756 and causes the processor 748 to execute the various acts required by the operating system to input and output data and to store data in memory, including storing files on the non-volatile storage 756.

Figure 8:
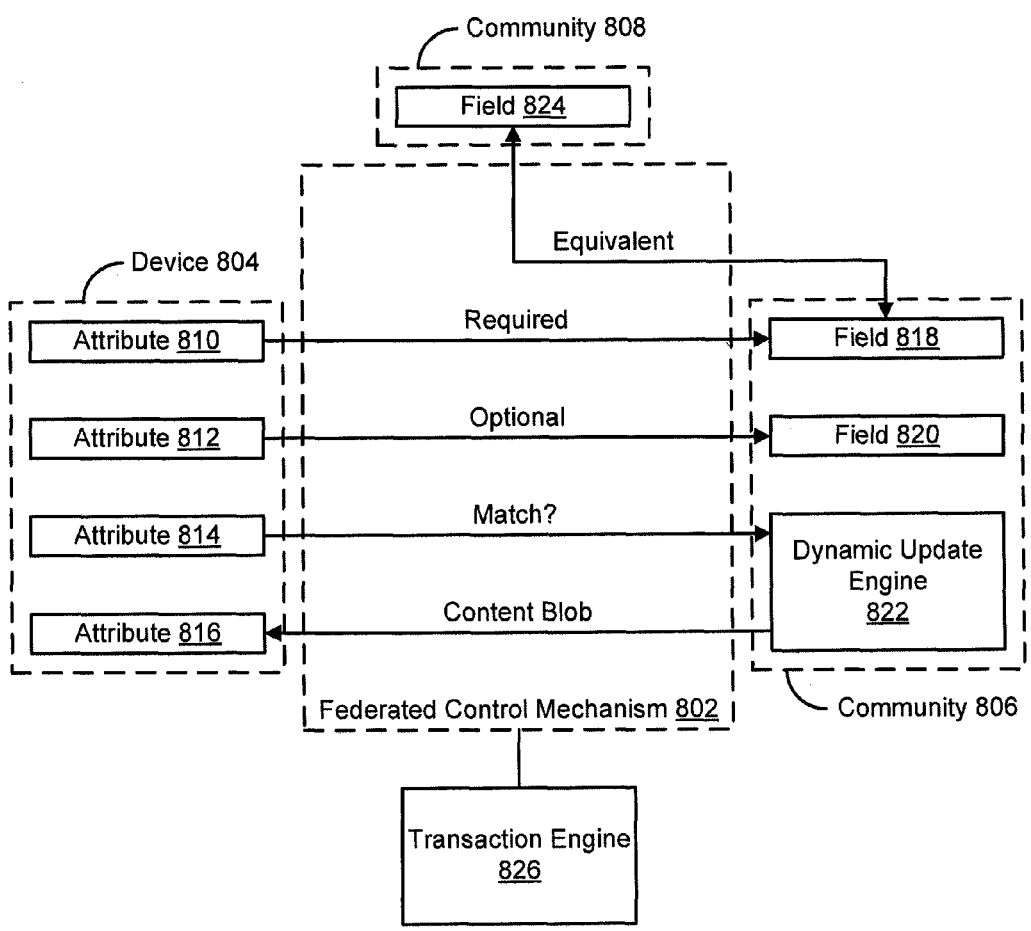
FIG. 8 depicts a conceptual drawing of a federated system.

FIG. 8 depicts a conceptual drawing of a federated system 800. The example of FIG. 8 is intended to illustrate some functionality that can exist in a federated control mechanism. The examples are intended to show how community fields and attributes can be coordinated in a federated system.

The system 800 includes a federated control mechanism 802, a device 804, a community 806, and a community 808. The device 804 includes attributes 810, 812, 814, 816. The device 804 is intended to be associated with a content owner who owns the attributes 810, 812, 814, 816. The community includes field 818, 820 and a dynamic update engine 822. As used in this paper, an engine includes a processor and memory including memory modules that can be executed by the processor. Attributes and fields are similar, but a different name is given for illustrative purposes. The community 808 includes a field 824. The term "community" is used to describe the communities 806, 808, but the communities could represent any party, including companies, devices of other users, etc. The system 800 also includes an optional transaction engine 826.

In the example of FIG. 8, the attribute 810 includes contents that are a required field for a member of the community 806. Examples of required fields could include a username, password, account number, etc. The federated control mechanism 802 knows of the association between the fields and can facilitate the matching of the attribute contents to the field. This can be accomplished by, for example, providing a list of communities to a user of the device 804 and enabling the user to indicate that the user is or wishes to become a member of the community. When the user indicates interest in the community 806, the federated control mechanism 802 can prompt the user to give the community 806 permission to the attribute 810. Even if a field is required, it is not necessarily the case that the federated control mechanism 802 need ensure that the attribute is provided. For example, a user could still login to a community website by keying in a username. The federated control mechanism 802 can also be implemented at a website associated with the community 806, prompting the user for the field 818 and/or asking for permission to the attribute 810. It is more likely that the federated control mechanism 802 will know about popular websites than unpopular ones, and be programmed to understand the various fields. However, learning about communities can be automated by crawling for field values, rather than "learning" by being specifically programmed for given communities.

In the example of FIG. 8, the field 818 of the community 806 and the field 824 of the community 808 are equivalent. The federated control mechanism 802 may or may not automatically share the attribute with sister communities (or automatically share if the user indicates such sharing is permitted), or it may simply know that the attribute 810 is applicable to both field 818 and 824 even if the fields are identified differently. Attributes can also be combined into a single field in some cases, such as if birthday is stored as day, month, and year in three distinct attributes, but is stored as a single string of characters in a field.

In the example of FIG. 8, the federated control mechanism 802 knows that the attribute 812 is an optional field 820 in the community 806. In many respects, optional fields are treated the same as required fields, though a user may indicate in a risk profile that permissions to attributes associated with optional fields are for "public" attributes, while permissions to attributes associated with required fields include "private" (though perhaps not "secret" or "very private") attributes. The user is under no obligation to provide permissions to the attribute 812, and is unlikely to be inconvenienced by refusing, since the field 820 is optional.

In the example of FIG. 8, the federated control mechanism 802 may provide the shared attribute 814 to the community 806. In this example, the attribute 814 changes over time. For example, the attribute 814 could be associated with a current location or a current rank in a loyalty program. If the attribute 814 is shared with the community 806, a dynamic update engine 822 associated with the community 806 can compare the attribute 814 with relevant parameters. For example, if a user is indicated to be in a certain city and the community 806 is associated with a coffee shop, the community 806 may be interested in updating the user regarding where in the city they can find the community 806 coffee shops. To accomplish this update, the dynamic update engine sends a content blob to the device 804, which can be stored as an attribute 816. Note that the attribute may become an attribute of the user, or instead the attribute could be considered to be owned by the community 806, which like all users of the federated system 800, can have attributes to which permissions are granted. Since attributes are intended to have broad meaning, the distinction is academic. Individual users could also update one another based upon changing attributes, either their own (which would be a straight-forward update of an old attribute) or of the target's attributes (which would essentially be an invitation or advertisement).

With the various transactions that pass through the federated control mechanism 802, as well as the knowledge base of the federated control mechanism 802 about users (including communities), the federated system 800 can perform additional useful functionality, if it is configured to do so. For example, the federated system 800 could record what client/device receives a file; how, where, and when a file is accessed by whom; storage limitations of clients; file transfer size; file transfer metrics (e.g., latency, throughput, between interchange and clients/devices); what users are accessing, storing, updating, and sharing files; who has permission to file access; user statistics related to file access; and if a client/device is accessing the server. It may also be desirable to know what a user is accessing when and from what device/client; how often a user shares and requests files. Thus, the federated system server can control and track file access based on its sharing paradigm. It may also be desirable to monitor or measure file requests via, e.g., filesystem services. Some of this functionality and/or other useful functionality can be provided by what is represented in the example of FIG. 8 as the transaction engine 826.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques described in this paper relate to apparatus for performing relevant operations. This apparatus may be specially constructed for the required purposes, or, advantageously, it may comprise a general purpose computer specially purposed by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the present invention is not described with reference to any particular programming language, and various embodiments may thus be implemented using a variety of programming languages.

While techniques have been described by way of example in terms of certain embodiments, it will be appreciated by those skilled in the art that certain modifications, permutations and equivalents thereof are within the inventive scope of the present invention. An exhaustive list of all combinations and permutations of embodiments has not been attempted here but one skilled in the relevant arts will recognize alternative embodiments based on those methods described herein.

The invention claimed is:

1. A method executed on a processor, the method comprising:
   maintaining a passive permission table indicative of first one or more attributes of a first user to which a second user has permission;
   receiving acknowledgement from the second user of acceptance of a dynamic permission to a content blob including second one or more attributes of the first user;
   maintaining a dynamic permission table indicative of the second one or more attributes of the first user to which the second user has permission;
   maintaining permissions in the dynamic permission table to facilitate reblobulation from the second user of the second one or more attributes associated with the dynamic permissions.

2. The method of claim 1, further comprising the first user storing the first one or more attributes.

3. The method of claim 1, further comprising the first user configuring a risk profile scheme.

4. The method of claim 1, further comprising the first user granting passive permission to the user account associated with the second user for the first one or more attributes.

5. The method of claim 4, wherein the passive permissions are granted in accordance with a risk profile scheme.

6. The method of claim 1, further comprising the first user receiving requests for additional permissions in accordance with a federated control mechanism.

7. The method of claim 1, further comprising the first user storing the second one or more attributes.

8. The method of claim 1, further comprising the first user granting dynamic permission to the second user for the second one or more attributes.

9. The method of claim 1, further comprising the first user sending the dynamic permission to the second user.

10. The method of claim 1, further comprising the first user getting the acknowledgement from the second user of acceptance of the dynamic permission.

11. The method of claim 1, further comprising the first user sending the content blob to the second user.

12. The method of claim 1, further comprising reblobulating a machine of the first user from another machine, the other machine associated with the user account of the second user in accordance with the dynamic permission table.

13. The method of claim 1, further comprising obtaining attributes from users having permission to the attributes.

14. A system comprising:
   a permission server;
   a passive permission table;
   a dynamic permission table;
   wherein, in operation:
      the permission server receives passive permissions from a first user granting permission to first one or more attributes of the first user;
      the permission server saves the passive permissions in the passive permission table;
      the permission server receives from a second user acknowledgement of acceptance of a dynamic permission from the first user to second one or more attributes of the first user;
      receiving a request from the second user for the second one or more attributes;
      facilitating provisioning of the second one or more attributes from the first user to the second user;
      receiving a request from the first user for the second one or more attributes;
      facilitating reblobulation of the second one or more attributes from the second user to the first user.

15. The system of claim 14, further comprising a client associated with the first user that sends the passive permissions to the permission server.

16. The system of claim 14, further comprising a client associated with the first user that sends the dynamic permissions to the permission server.

17. The system of claim 14, further comprising a client associated with the second user that sends the acknowledgement of acceptance of dynamic permission to the permission server.

18. The system of claim 14, further comprising a client associated with the first user that sends the request for the second one or more attributes.

19. The system of claim 14, further comprising a federated control mechanism.

20. A system comprising:
   a processor;
   means for implementing a user risk profile scheme;
   a federated control mechanism for automatically associating attributes of a first user with third party fields;
   means for content blobulation from a first user to a second user, the content blobulation being in accordance with the user risk profile scheme, with the federated control mechanism ensuring proper association between content blob attributes and the third party fields;
   means for content reblobulation from the second user to the first user.

* * * * *